May 30, 1967 M. A. MALNORY 3,322,074
DOUGH MOLD

Filed Jan. 20, 1964 2 Sheets-Sheet 1

INVENTOR.
Madeline A. Malnory
BY Cyril M. Hajewski
Attorney

May 30, 1967 M. A. MALNORY 3,322,074
DOUGH MOLD
Filed Jan. 20, 1964 2 Sheets-Sheet 2
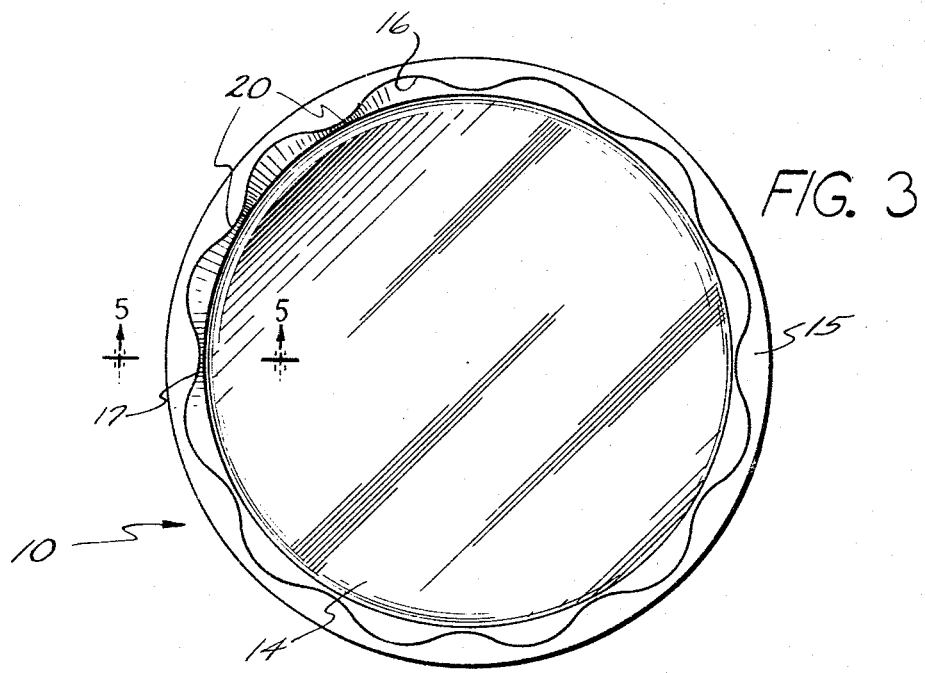
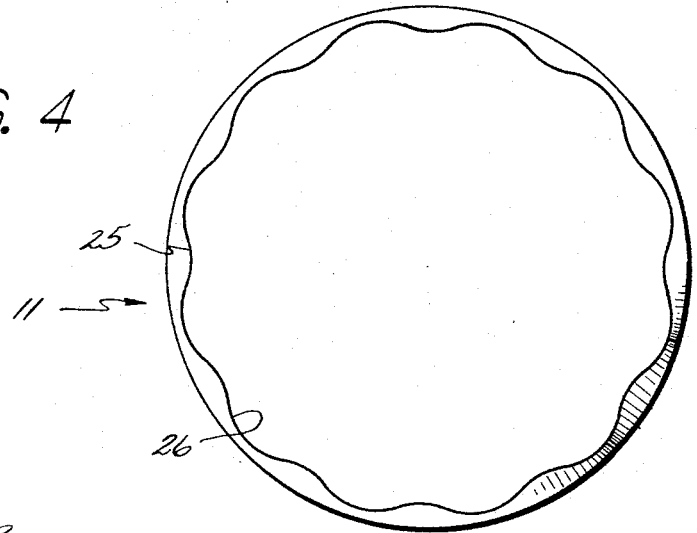
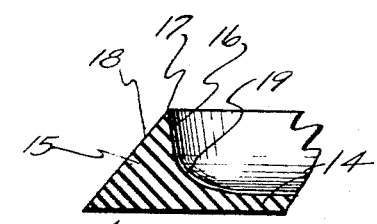
INVENTOR.
Madeline A. Malnory
BY
Cyril M. Hajewski
Attorney

United States Patent Office 3,322,074
Patented May 30, 1967

3,322,074
DOUGH MOLD
Madeline A. Malnory, 6411 W. Arthur Ave.,
West Allis, Wis. 53214
Filed Jan. 20, 1964, Ser. No. 338,838
2 Claims. (Cl. 107—46)

This invention relates generally to a mold for rolling dough into a sheet having a desired configuration and more particularly to an improved mold for rolling the dough that forms the crust of pies.

In the baking of pies the crust is formed by rolling the dough into a sheet of the desired thickness with a rolling pin and considerable skill is required to produce a crust of uniform and optimum thickness. The sheet of dough is made sufficiently large to overlie the pie tin in which the pie is baked and the excess dough is trimmed from the sheet after the latter is in place. Molds have been provided to facilitate rolling the dough into a sheet of predetermined uniform thickness and into a diameter to exactly fit the pie tin in order to avoid the necessity of trimming the dough. However such previous molds have failed to take into account that two different diameters of pie crust are required, one for the bottom crust of the pie and the other for the top crust. Furthermore, the previous molds of this type have been either bulky or inconvenient to clean, requiring a disassembly of the parts to effectively clean the unit.

It is therefore a general object of the present invention to provide an improved mold for shaping the dough that forms the crust of a pie.

Another object of the present invention is to provide a mold that is especially adapted to produce one diameter of crust for the bottom of a pie and a different diameter crust for the top of the pie.

Another object is to provide a pie crust mold integrally formed of a plastic material without crevices or sharp corners so that it may be conveniently cleaned with a minimum of effort.

Another object is to provide a pie crust mold having a sharp cutting edge for defining the outline of the sheet of pie crust with the cutting edge following an irregular path so that the perimeter of the pie crust is formed into a pleasing design that enhances the appearance of the pie.

A further object is to provide a pie crust mold of simple and inexpensive but sturdy construction which is particularly efficient in operation.

According to this invention the improved mold for shaping the sheet of dough that forms the crust of a pie comprises a mold that is integrally fabricated of molded flexible plastic shaped to form the bottom of the pie crust. The mold includes a cutting edge that defines the perimeter of the pie crust, the cutting edge being formed to follow an irregular path for producing the outline of the pie crust in a pleasing design. Since the top of the pie crust is of a lesser diameter than the bottom, an annular insert is provided for insertion into the mold to occupy its peripheral area. The insert is likewise provided with a cutting edge that is disposed within the cutting edge of the mold proper for reducing the size of the crust to accommodate the top of the pie. The cutting edge on the insert also follows an irregular path to produce an outline in the top of the pie crust which complements the outline produced along the perimeter of the bottom of the pie crust so that the appearance of the completed pie is enhanced.

The foregoing and other objects of the invention which will become apparent from the following detailed specification setting forth an illustrative embodiment, may be achieved by the particular apparatus depicted in and described in connection with the accompanying drawings, in which:

FIGURE 3 is a plan view of the mold illustrated in FIGURE 1 with the annular insert removed so that it may be utilized for shaping the bottom crust of the pie;

FIGURE 4 is a plan view of the annular insert which is shown assembled in the mold in FIGURE 1; and FIGURE 5 is an enlarged view in vertical section taken along the plane represented by the line 5—5 in FIGURE 3 to clearly show the construction of the rim of the mold.

Figure 1:
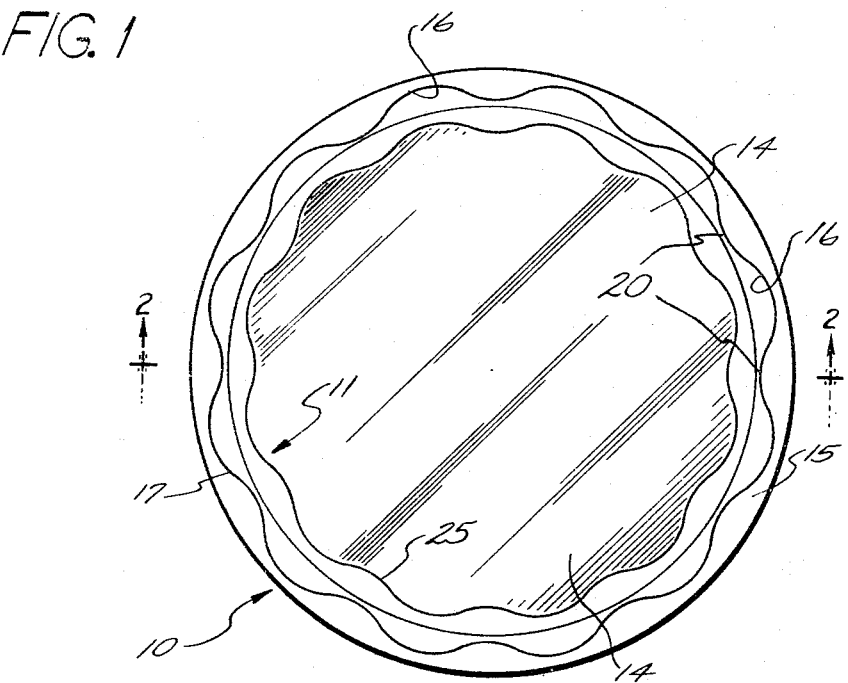
FIGURE 1 is a plan view of a mold for shaping the crust for a pie with an annular insert assembled therein to shape the top crust of the pie.
Figure 2:
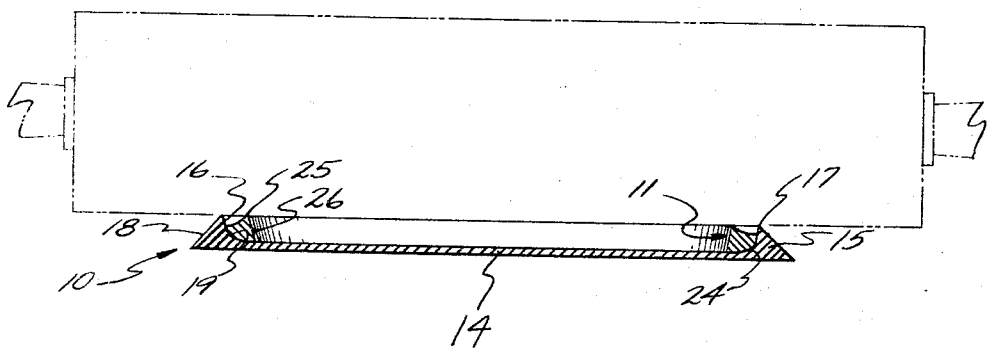
FIGURE 2 is a view in vertical seciton taken along the plane represented by the line 2—2 in FIGURE 1 with a rolling pin indicated by broken lines in operation position on the mold.

Reference is now made more particularly to the drawings and specifically to FIGS. 1 and 2 thereof which illustrate a dough mold constructed in accordance with the teachings of the present invention for shaping a pie crust. As there shown, the mold is comprised of two members, a base mold generally identified by the reference numeral 10 and an annular insert which is generally indentified by the reference numeral 11.

As is well known, pie crusts are formed in two portions with the bottom portion placed over the bottom of the pie tin and overlying the upwardly extending side of the tin. After the contents of the pie have been placed on top of the bottom crust, a top crust is appiled over the top of the pie to enclose the contents. The bottom crust is of a greater diameter than the top crust and the single mold illustrated in FIG. 1 is especially adapted to shape both of these crusts. To this end, the bottom crust is formed in the base mold 10 with the annular insert removed. After the bottom crust has been shaped and removed from the mold 10, the annular insert 11 is inserted into the base mold for the purpose of reducing the diameter of the mold for shaping the top of the pie crust.

The base mold 10 is clearly shown in FIG. 3 and comprises a bottom 14 having a continuous peripheral rim 15 that extends upwardly from the bottom 14. The rim 15 is provided with an inner surface 16 which follows an irregular or wavy path to form a scallop design. This scalloped surface 16 will establish the perimeter of the pie crust shaped in the mold and a scalloped design is illustrated as an exemplary embodiment for enhancing the appearance of the completed pie although it should be understood that other decorative designs may be incorporated into the mold for this purpose.

As best shown in FIG. 5 the top of the interior surface 16 intersects an exterior surface 18 to form a cutting edge 17 at the upper extremity of the rim 15. The exterior surface 18 tapers downwardly and outwardly from the cutting edge 17 to provide body to the rim 15. Since the interior surface 16 extends along a wavy path to form a decorative design as illustrated in FIG. 3, the cutting edge 17 will likewise follow this same path.

The base mold 10 is preferably integrally formed of a plastic material with the bottom 14 being a relatively thin sheet possessing substantial flexibility so that it can be manipulated for removing the shaped dough from the mold. However, the bottom 14 is integrally formed with the rim 15 as shown in FIG. 5 with the inner surface 16 of the rim 15 being joined to the top of the bottom 14 by a radius or fillet 19 to facilitate cleaning of the mold. The inner surface 16 tapers slightly outwardly of the interior of the mold so that there is nothing to hinder the removal of the shaped dough from the mold. With this arrangement the entire mold is integrally formed of a single material and corners and crevices are eliminated so that the shaped dough can be very readily removed from the mold and the latter can then be easily cleaned.

As previously mentioned, the base mold 10 is provided for shaping the dough that forms the bottom of the pie crust. The top of the pie crust is of a somewhat smaller diameter and this smaller diameter is accommodated by the insert 11. The insert 11 is an annular ring preferably formed of the same material as the base mold 10. The outer diameter of the insert 11 corresponds to the diameter of a circle that has a periphery which is directly adjacent to the inner crests 20 of the wave formed by the cutting edge 17. As illustrated in FIG. 2, the exterior bottom of the annular ring 11 is provided with a radius 24 which complements the radius 19 in the mold 10 so that the annular ring 11 will fit snugly into the base mold 10 with the bottom of the annular ring 11 flush with the annular peripheral area of the top surface of the bottom 14 of the base mold 10.

The top surface of the annular ring 11 tapers upwardly from its outer diameter to form a cutting edge 25 with an inner diameter 26 extending downwardly from the cutting edge at a slight angle inwardly to again facilitate the removal of the shaped dough from the mold. The inner surface 26 of the annular ring 11 as well as the cutting edge 25 follow the same wavy path that is followed by the cutting edge 17 of the base mold 10 so that the perimetric outline of the top of the pie crust will correspond to the outline of the bottom of the pie crust.

In operation, the baker will place a quantity of raw dough within the base mold 10 and roll a rolling pin over the dough with the surface of the rolling pin in engagement with the cutting edge 17 as indicated in FIG. 2 where the rolling pin is represented by broken lines in operating position over the mold. The dough will be rolled until it completely fills the interior of the base mold 10 with the excess dough being rolled out of the mold over the cutting edge 17 so that a decorative outline will be formed along the perimeter of the shaped dough. In addition, the latter will be of a uniform thickness throughout, corresponding to the height of the cutting edge 17 above the top surface of the bottom 14. It has been found that a height of approximately one-eighth inch will shape a proper pie crust although other heights may be furnished to suit the individual taste.

After the interior of the base mold 10 has been completely filled by rolling the dough into the mold the latter is inverted and by a slight manipulation of the flexible bottom 14 the dough will be released from the mold into the pie pan. After placing the pie filling into the bottom crust, the baker will place the insert 11 into the base mold 10 and repeat the process except that now a quantity of raw dough will be placed into the interior of the annular insert 11 within its inner surface 26 and the dough will be shaped therein by moving the rolling pin over the cutting edge 25. After this space has been completely filled with dough and the excess dough severed from the shaped dough along the cutting edge 25, the base mold 10 with the insert 11 therein is inverted and the flexible bottom 14 is again manipulated to release the shaped dough onto the top of the pie. Thus, the size of the shaped dough for the top of the pie crust has been reduced by the space between the cutting edges 17 and 25 to produce the smaller crust required for the top of the pie.

The cutting edges 17 and 25 have been illustrated as following a wavy path to form a scalloped design but this design can be varied at the discretion of the designer to produce different decorative affects. Furthermore, the cutting edge 25 does not need to follow a path of the same design as formed by the cutting edge 17. Instead, it can be shaped into a different design which complements the design of the cutting edge 17 to produce a complex pattern when the top crust outline is superimposed on the bottom crust outline.

From the foregoing detailed description of the construction of the illustrative embodiment of the present invention, it will be apparent that a new and improved mold has been provided for shaping the crusts of pies. The mold is especially adapted to accommodate the different sizes required for the bottom of the pie crust and the top of the pie crust while imparting a pleasing design to the perimeter of both crusts, with the mold being particularly efficient in operaiton and readily cleaned.

Although the illustrative embodiment of the present invention has been described in considerable detail for the purpose of making a full disclosure of a practical operative arrangement by means of which the invention may be practiced, it is to be understood that various novel features of the invention may be incorporated in other arrangements without departing from the spirit and scope of the invention as defined in the subjoined claims.

The principles of the invention having now been fully explained in connection with the foregoing description of embodying structure, I hereby claim as my invention:

1. In a mold for shaping the dough that forms the crust for pies; a bottom panel; a rim extending about the periphery of said bottom panel and cooperating with the latter for forming a cavity to receive the dough that is to be molded into the shape of the bottom of the pie crust with the inner surface of said rim being shaped into a decorative design that defines the perimeter of the cavity to provide the pie crust that is formed in said cavity with a pleasing appearance; a cutting edge extending along the entire top of said rim in a path corresponding substantially to the path of the inner surface of said rim; an insert adapted to fit within the cavity of the mold and resting upon said bottom panel for changing the configuration of the dough that is to be shaped with the inner surface of said insert being shaped into a decorative design and cooperating with said bottom panel to form a cavity of such configuration as to form the top of the pie crust; having a decorative outline to improve its appearance; and a cutting edge extending along the top of said insert in a path corresponding substantially to the path of the inner surface of said insert.

2. In a mold for shaping dough; a bottom panel formed of flexible material to facilitate removing the shaped dough from the mold; a rim extending about the periphery of said bottom panel to form a mold cavity of one configuration with said bottom panel, the inner surface of said rim tapering outwardly from said bottom panel; a fillet joining said bottom panel to said rim; a cutting edge extending along the top of said rim; an insert adapted to fit within the cavity of the mold and resting upon said bottom panel to cooperate therewith for forming a mold cavity of a second configuration, the inner surface of said insert tapering outwardly from said bottom panel; and a cutting edge extending about the top of said insert along the path of the upper extremity of its inner surface; whereby the dough may be shaped into one configuration by removal of said insert and a second configuration may be obtained by installing said insert in the mold while the tapering inner surfaces, the fillet and the flexibility of the bottom panel facilitate the removal of the shaped dough from the mold.

References Cited

UNITED STATES PATENTS

| | | | |
|---|---|---|---|
| 2,237,697 | 4/1941 | Brown | 99—432 |
| 2,868,145 | 1/1959 | Brooke | 107—46 |
| 2,968,261 | 1/1961 | Tonkin | 99—430 X |
| 3,128,724 | 4/1964 | Linder | 249—102 |
| 3,166,027 | 1/1965 | Sprenzel | 107—46 |

WALTER A. SCHEEL, *Primary Examiner.*

S. P. FISHER, *Assistant Examiner.*